Dec. 29, 1970 W. MEHNERT ET AL 3,551,893

POWER FLUCTUATION SIMULATOR

Filed Jan. 24, 1967 3 Sheets-Sheet 1

United States Patent Office 3,551,893

Patented Dec. 29, 1970

3,551,893

POWER FLUCTUATION SIMULATOR

Walter Mehnert, Munich, Peter Koerv, Anzing, Heinz Hermes, Hamburg, Klaus-Dietzl Thieme, Wedel, and Herbert Sedlacek, Hamburg, Germany, assignors to Licentia Patent-Verwaltungs GmbH, Frankfurt am Main, and Entwicklungsring Sud GmbH, Munich, Germany, both corporations of Germany Filed Jan. 24, 1967, Ser. No. 611,377

Claims priority, application Germany, Jan. 24, 1966, L 52,697

Int. Cl. G01r *1/00*

U.S. Cl. 340—172.5 6 Claims

ABSTRACT OF THE DISCLOSURE

A series of voltages characteristic of the output of a power supply system operating under various conditions is recorded in a selected sequence on a magnetic tape. The magnetic tape is played back and used to test the reaction of various elements in an electrical system to fluctuations in power which might be encountered in actual operation.

BACKGROUND OF THE INVENTION

In the manufacture of aircraft electrical systems, it is desirable to be able to test the reaction of electrical and electronic apparatus to the various conditions that they will possibly be subjected to in flight. For this purpose, various types of simulators have been devised which attempt to recreate certain actual operating conditions in order to locate faulty components and to test the desirability and adapability of various aircraft electrical systems.

One such simulator known to applicants comprises two programmed voltage sources. One source is varied in voltage and is connected to the input of a generator voltage regulator. The other source is varied in frequency and is connected to the input of a generator speed regulator. With the two programmed voltage sources, an attempt is made to simulate the output of a generator under various operating conditions in order to test the reaction of the generator control circuit.

SUMMARY OF THE INVENTION

All of the power fluctuation simulators known to applicants are lacking both in the realism with which a power supply may be simulated and in the number and variety of various operating conditions which may be recreated. These are the particular problems solved by applicants with the present invention.

In a preferred embodiment of the invention, two or more magnetic tape recorders are provided along with various function generators, pulse generators, and control circuitry. The tape recorders and associated apparatus are used first, to make a tape having a number of various simulated voltage conditions recorded thereon and second, to assemble a program tape having various voltage conditions arranged thereon in a certain selected order. The desired order of occurrence of the voltage conditions on the program tape may be chosen by a computer. In one embodiment of the invention, two recorders are arranged to play a number of program tapes sequentially by switching from one recorder to another as the tape on the first recorder runs out.

The simulator is capable of making a program tape to simulate the output of many different power supply systems; e.g., three-phase A-C, single phase A-C, or D-C. Additionally, the voltage, frequency, and phase of the simulated waveforms may be varied and other characteristics inherent in certain power systems (such as switching transients) may be added.

Provision is also made for the manual mixing of various voltage conditions while at the same time recording the conditions being applied to a test system. If failure of a test piece occurs, the recording permits the set of conditions inducing the failure to be recreated.

Generally, in an aircraft electrical system there is produced a four-wire, three-phase voltage. Under various conditions of flight or environment the three-phase system may become unbalanced thereby inducing a current to flow in the fourth wire of the system. A particular feature of the invention is the simulation of this imbalance in an actual power system by vectorially adding the three-phase components of the recorded condition to produce a "zero-voltage" indicative of the degree of imbalance in the simulated condition. The zero-voltage is added to the three-phase condition by means of a differential amplifier. The composite waveform is a simulation of the shift of a generator neutral point that would result from imbalance in an actual power system.

The output of the simulator may be applied to any of the various electrical components or systems to be tested in order to observe their reaction to power fluctuation. Also, the simulator may be used to test the components of a power distribution system (such as protective circuit breakers) for proper operation.

BRIEF DESCRIPTION OF THE DRAWINGS

The nature of the present invention and its various advantages will appear more fully from the following detailed description when taken in connection with the appended drawing, in which.

DESCRIPTION OF THE PREFERRED EMBODIMENTS

Figure 1:
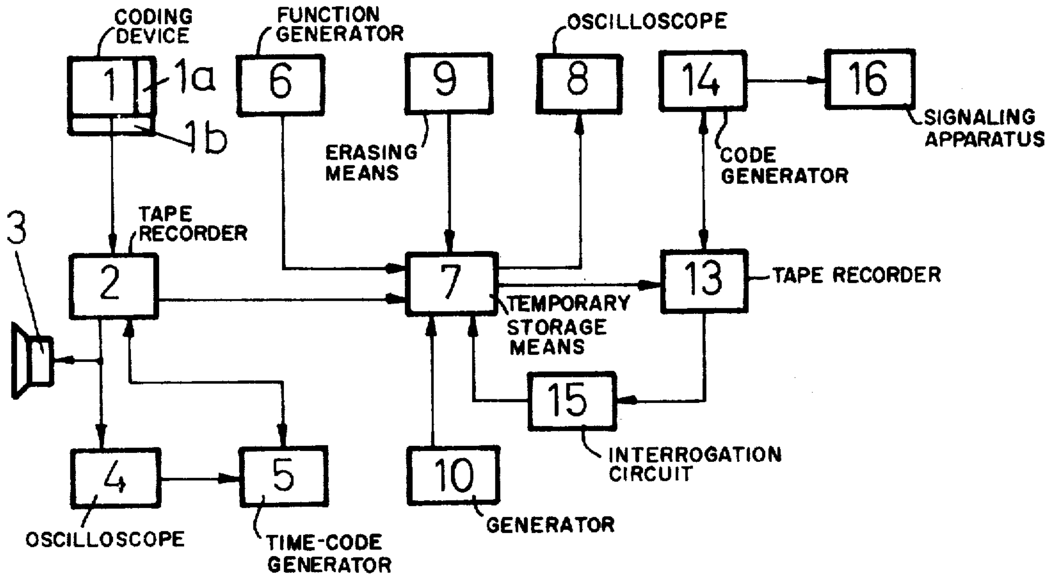
FIG. 1 is a block diagram of the basic components of the system of the invention for assembling a condition storage tape.

Referring now in more detail to the drawing, FIG. 1 depicts a coding device 1 which is provided in the system. The coding device 1 may include a plurality of function generators and the associated control and mixing circuitry necessary to produce a composite, three-phase voltage condition. Various conditions may be generated by varying the magnitude or frequency of the composite voltage or by changing the relative phase relation of the composite voltage components.

The coding device 1 may also include a first control apparatus 1*a* to effect the statistical and programmed mixing of various voltage conditions and a second control apparatus 1*b* for automatically adjusting the coding device 1 to produce a preselected voltage condition. The output of the coding device 1 is applied to the input of a first tape recorder 2. The recorder 2 is capable of recording voltages on a plurality of tracks at a frequency substantially above the usual cut-off frequency (20,000 c.p.s.) of conventional recorders.

As a selected signal from the coding device 1 is applied to the tape of the first recorder 2, a playback head and amplifier 3 reads the tape and feeds the signal into a first oscilloscope 4. The oscilloscope 4 serves to display the waveforms being recorded so that an operator may analyze the voltage pattern and assign a code to that particular set of voltage conditions. A time-code-generator 5 is provided to apply the selected code signal to the magnetic tape, either simultaneously on a separate track from the recorded voltage condition or on the same tracks at the end of a particular condition. In this manner, a magnetic tape is made having different groups of three-phase voltage conditions spaced along the tape along with an associated characteristic code for each of the groups.

An intermediate storage means 7 of any suitable type, which may include a tape or disc-type recorder, is provided with a number of inputs. Signals from the first recorder 2, from a function generator 6 or control pulses from a generator 10 may be stored. The function generator 6 can supply various waveforms to simulate the output of different types of power supplies, e.g., single phase A-C or D-C. The control pulses from the generator 10 are to be subsequently used to (1) trigger the operation of a pulse generator 11 which simulates the high frequency pulses due to switching transients inherent in some power supplies and (2) trigger the closure of thyristor-type switches which connect the simulated voltage conditions to load distribution bus bars and test the reaction of the protective circuit breakers of the system.

The simulated voltage conditions stored in the intermediate storage 7 are examined by means of an oscilloscope 8. Parts of the stored waveform which are undesirable or not of interest may be erased by an erasing means 9. The conditions and control pulses stored in the intermediate storage 7 are read out on command from an interrogation circuit 15.

The various voltage conditions stored in the intermediate storge 7, i.e., the composite three-phase voltages, the control pulses, and the waveforms from the function generator 6, are to be assembled into a condition storage tape. The condition storage tape is to include a number of voltage conditions spaced along a magnetic tape wherein each condition is preceded by a start signal and the characteristic code for that particular condition and is followed by a stop signal for that condition and the start signal for the next succeeding condition. The conditions are also numbered continuously along the tape.

A condition storage tape may be assembled as follows: with reference to FIG. 1, the output of the temporary storage 7 is connected as an input to a second tape recorder 13, which may be identical to the first recorder 2. A signaling apparatus 16 serves to record a start signal on the tape of the second recorder 13 and also to continuously number the individual conditions as they are placed on the tape. A code generator 14 records a code on the tape immediately following the start signal. The characteristic code recorded corresponds to the one for the condition that is then aligned and ready to be played back out of the storage 7. After the code is recorded, the interrogation circuit 15 triggers the readout from the temporary storage 7 and the voltage condition aligned therein is recorded on the condition storage tape by the recorder 13. Following the end of the recording of the voltage condition, a stop signal is placed on the tape by the signaling apparatus 16. The tape is now ready to receive another coded set of voltage conditions.

Figure 2:
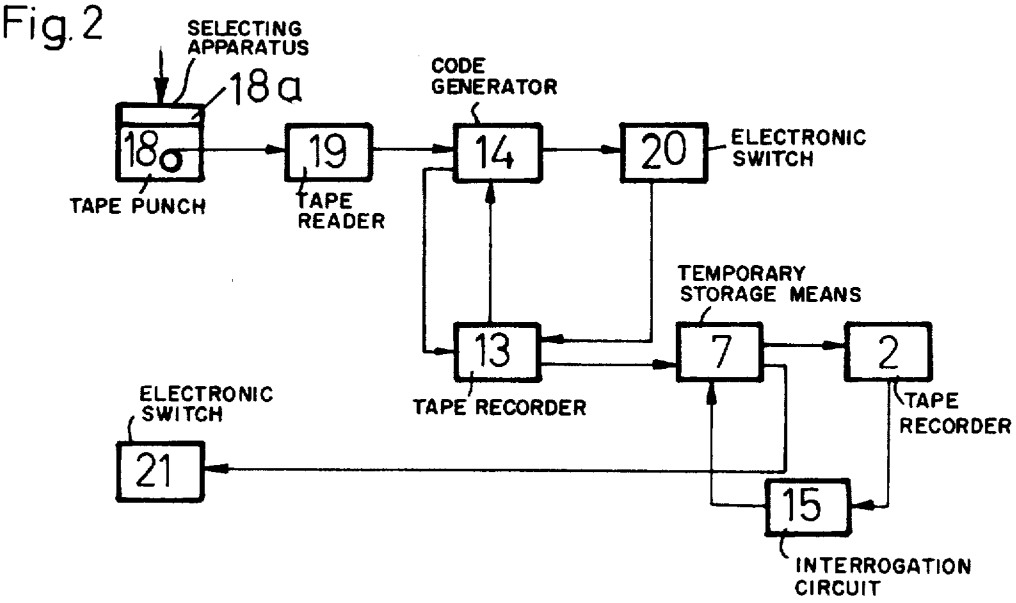
FIG. 2 is a block diagram of the system for assembling a condition program tape.
Figure 5:
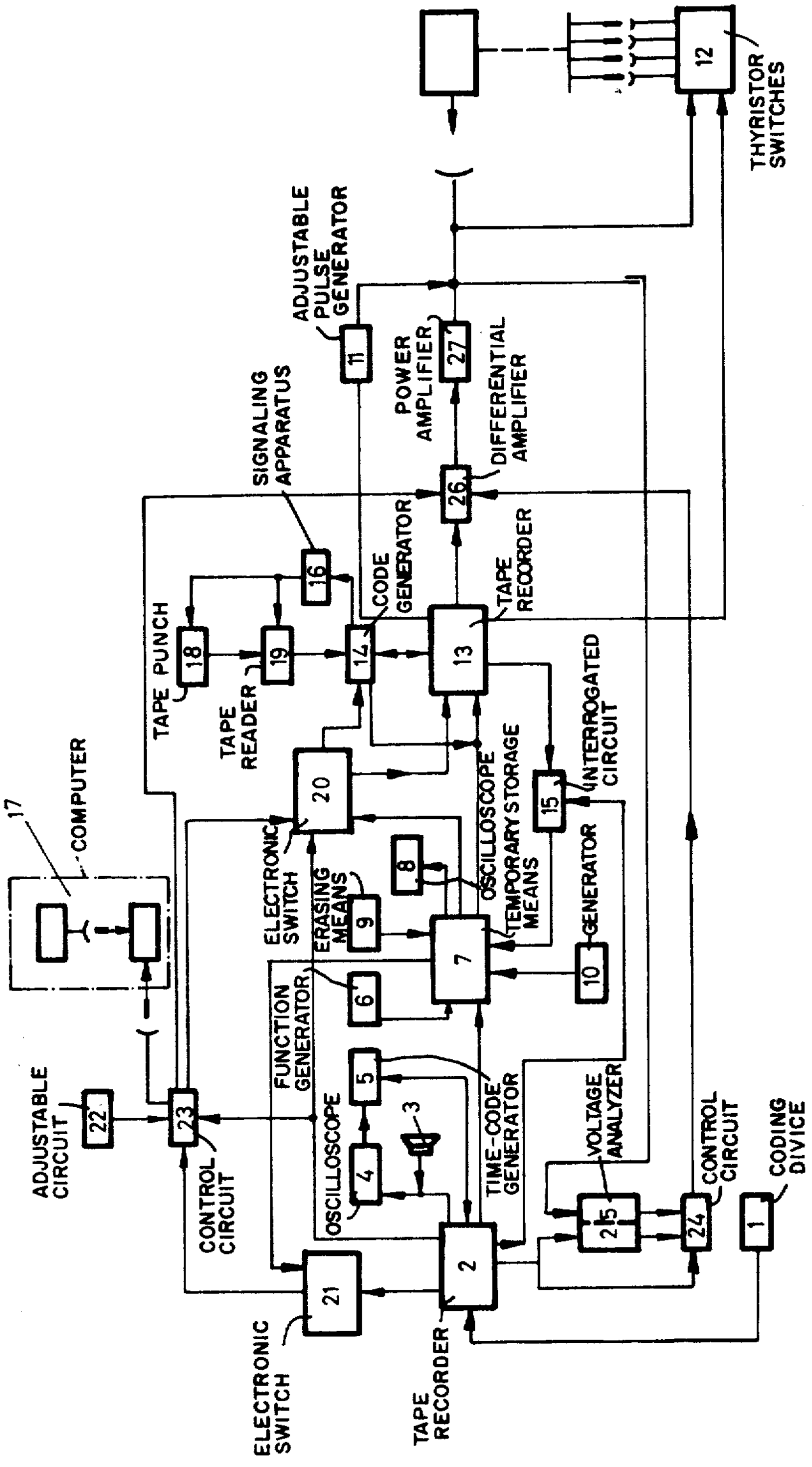
FIG. 5 is a block diagram of the overall voltage fluctuation simulator system.

Once a condition storage tape has been prepared it is desirable to assemble a program in which various simulated voltage conditions and control pulses are arranged to occur in a particular sequence. A program of conditions is assembled on a magnetic tape in the following manner. With reference to FIGS. 2 and 5, a desired sequence of conditions is preselected by a computer 17 and the characteristic codes corresponding to these conditions are punched, in order, into a proper tape by a tape punch 18 under control of a selecting apparatus **18*a*. The perforated tape is read by a tape reader 19 which is connected to a control circuit 14 associated with the second tape recorder 13. A condition storage tape, described above, is carried by the tape recorder 13**.

The perforated tape is advanced one position so that a code punching is positioned in the reader 19. As the code is being continuously read out, a control circuit 14 winds the condition storage tape on the recorder 13 either forward or backward until the code on the magnetic tape corresponds to the code being read from the perforated tape. When the two codes correspond, a first electronic switch 20 is triggered which switches the recorder 13 over to "playback" and reads the selected voltage condition, without its code, into a temporary storage 7. The stop signal at the end of the voltage condition triggers an interrogation circuit 15 which effects the transfer of the condition from the temporary storage 7 to a tape carried by the first recorder 2. When this transfer is complete, a second electronic switch 21 steps the next code on the perforated tape into the reader 19 and the cycle of operation begins again.

In the above manner, a condition program tape is assembled on the tape recorder 2. The program tape includes a number of voltage conditions and control pulses spaced one after another along the tape with no start and stop signals or characteristic codes between the conditions. The program tape is suitable for use directly in simulating voltage fluctuations or may be further modified as described below.

A characteristic of a three-phase, four-wire power distribution system is that when the system is not balanced a "zero-current" flows in the fourth wire which is indicative of the degree of imbalance. Imbalance may be due to the fact that the line or load impedances in the three phases are not equal or that the reactances in each of the phases of the generator are not identical. Imbalance results in the voltage magnitude for each of the phases being different or in the phase angle between each of the phases not being exactly 120°.

A particular feature of the invention is a provision to detect a voltage or phase imbalance in each of the simulated conditions and to generate a zero-voltage indicative of that imbalance. The zero-voltage is then superimposed upon the phase voltage condition in a proper phase relationship to simulate actual distribution system imbalance. The composite voltage condition is applied to test the reaction of a load system.

Figure 3:
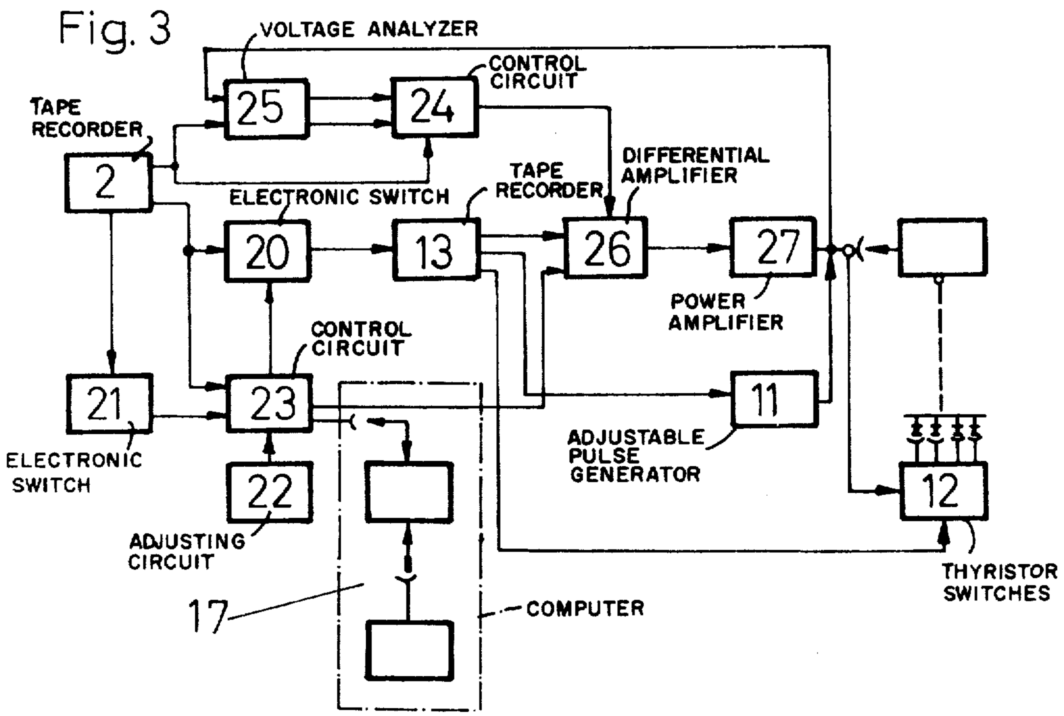
FIG. 3 is a block diagram of the system for superimposing a fictitious "zero-voltage" upon an imbalanced three-phase voltage condition and for playing back a condition program tape.

The simulated imbalance in the voltage condition is constructed in the following manner. With reference to FIGS. 3 and 5, a condition program tape is carried on a first tape recorder 2. At the beginning of a particular voltage condition a first control circuit 24 triggers the operation of a voltage analyzer circuit 25. In a known manner, the voltage analyzer 25 vectorially adds the components of the three-phase voltage conditions and produces a zero-voltage which is a function of the instantaneous imbalance in the conditions. The zero-voltage is fed through the first control circuit 24 into a differential amplifier 26.

The start of a voltage condition on the first recorder 2 also triggers a second control circuit 23 through a first electronic switch 21. The voltage condition from the recorder 2 is processed in the control circuit 23 under the control of an adjusting circuit 22. Processing may include the delaying of the condition.

The signal from the second control circuit 23 may be fed directly into the differential amplifier 26 in proper phase relationship with the zero-voltage from the first control circuit 24. Or, for greater flexibility, the signal from the control circuit 23 may be fed through a second electronic switch 20 into a second tape recorder 13 which is connected to the differential amplifier 26. In the differential amplifier 26, the three-phase voltage condition and the fabricated zero-voltage are superimposed in the proper phase relationship to simulate the rise and fall in potential of a generator neutral point. The composite voltage condition coming out of the differential amplifier 26 is further amplified by a power amplifier 27 and is then ready to be used for testing purposes.

As is shown best in FIG. 3, the power fluctuation simulator has a provision for simulating the voltage peaks due to switching transients which are inherent in some power supplies. The output of an adjustable pulse generator 11 is triggered and regulated as to waveform by control pulses placed on the tape by the pulse generator 10 (FIG. 1), as was discussed above. The control pulses are also used to trigger a set of thyristor-type switches 12 and connect the output of the simulator to a set of power distribution bus bars in order to test the reaction of the protective circuit breakers.

Figure 4:
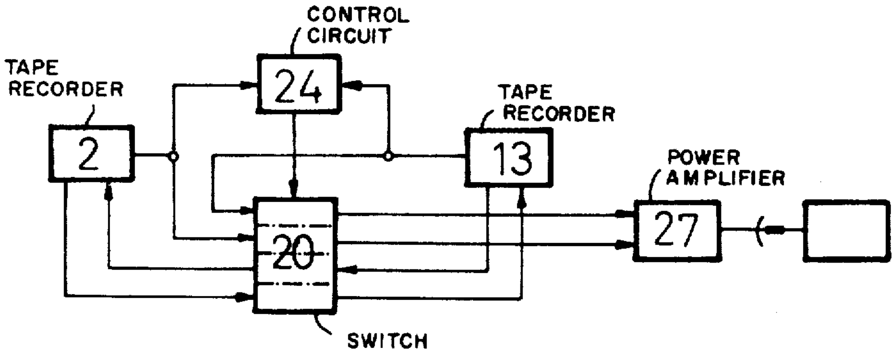
FIG. 4 is a block of the system for playing back a continuous program of prepared tapes.

In a further embodiment of the power fluctuation simulator, the arrangement shown in FIG. 4 is used to play a continuous series of program tapes by switching between two recorders. Near the end of a program tape being played by a first recorder 2 a signal is produced which actuates a control circuit 24 and a switching network 20. The control circuitry starts a second recorder 13 and feeds the signal recorded on its tape through the network 20 into a power amplifier 27 and at the same time effects the rewinding of the tape on the first recorder 2. The program tape is replaced on the first recorder 2 and when the tape on the second recorder 13 runs out, control is then switched to the first recorder 2. This arrangement effects the supply of a continuous series of voltage conditions to a load, with no pauses between successive condition program tapes.

It is to be understood the above-described arrangements of elements are simply illustrative of the principles of the invention, and many other modifications may be made without departing from the spirit and scope of the invention.

What is new and therefore desired to be protected by Letters Patent of the United States is:

1. A power fluctuation simulator comprising, in combination:
  means for generating a series of different voltage conditions, each of which voltage condition is characteristic of the output of an electrical power supply,
  means connected to the output of said voltage condition generating means for recording said series of voltage conditions on a magnetic tape,
  means for arranging said series of voltage conditions in a selected sequence, and
  means responsive to said arranging means for recording said series of voltage conditions in said selected sequence on a second magnetic tape, whereby said second magnetic tape may be used to simulate a sequence of fluctuations in a power supply.

2. A power fluctuation simulator comprising, in combination:
  means for generating a series of voltage conditions characteristic of the output of a power supply,
  means connected to receive the output of said generating means for recording said series of voltage conditions in a selected sequence on a magnetic tape,
  means for playing back said magnetic tape, and
  means for receiving the playback of said magnetic tape and for superimposing upon said series of voltage conditions while said tape is being played back, a series of pulses characteristic of switching transients inherent in power systems,

3. A power fluctuation simulator comprising, in combination:
  means for generating a series of voltage conditions characteristic of the output of a power supply,
  means connected to receive the output of said generating means for recording said series of voltage conditions in a selected sequence on a magnetic tape,
  playback means for playing back said magnetic tape upon which said selected sequence of voltage conditions is recorded,
  a power distribution bus bar system, and
  means for triggering the connection of said playback means to said power distribution bus bar system, whereby the reaction of said power distribution system to said series of voltage conditions may be evaluated.

4. A power fluctuation simulator comprising, in combination:
  means for generating a series of three-phase voltage conditions characteristic of the output of a three-phase power supply,
  means connected to the output of said generating means for recording said series of voltage conditions in a selected sequence on a magnetic tape,
  means for playing back said magnetic tape,
  means for receiving the playback of said magnetic tape, for vectorially adding the components of said three-phase voltage condition as they are played back from said magnetic tape and for producing a zero-voltage indicative of the degree of imbalance in said three-phase voltage condition, and
  means for superimposing said zero-voltage upon said three-phase voltage condition in a proper phase relationship, whereby said composite voltage simulates the waveform produced by a three-phase generator operating in an unbalanced condition.

5. A power fluctuation simulation for compiling a condition storage tape having a series of voltage conditions spaced in a serial relationship along a magnetic tape each condition of which is separated by a stop signal for the preceding signal and a start signal and characteristic code for the succeeding condition, which simulator comprises:
  means for generating a series of voltage conditions characteristic of the output of a power supply,
  a first magnetic tape recorder for receiving the output of said voltage condition generating means and for recording said series of voltage conditions,
  means for receiving and analyzing said series of voltage conditions and assigning a characteristic code to each voltage condition in said series of voltage conditions,
  intermediate storage means for storing for subsequent playback said seires of voltage conditions being recorded by said first tape recorder along with said characteristic code assigned to each voltage condition,
  a second magnetic tape recorder for recording said voltage conditions in a selected sequence on a magnetic tape carried by said second tape recorder, and
  control means for controlling the recording of said voltage conditions by said second tape recorder including:
  means for recording a start signal on a tape carried by said second tape recorder,
  means for recording a characteristic code immediately following said start signal, which code is identical to the characteristic code of the voltage condition which is at that instant aligned for playback in said intermediate storage means,
  means for triggering the playback of said aligned voltage condition in said intermediate storage means and recording said condition on the tape carried by the second tape recorder immediately following said start signal,
  means for recording a stop signal on the tape carried by said second tape recorder immediately following the end of said voltage condition being recorded, and
  means for preparing said control means to record a start signal for the next succeeding voltage condition.

6. A power fluctuation simulator for compiling a program storage tape having a series of voltage conditions spaced in a serial relationship along a magnetic tape in a selected sequence, which simulator comprises:
  a first magnetic tape having a series of voltage conditions recorded thereon, each condition of which is immediately preceded on the tape by a recorded code characteristic of that particular voltage condition,
  means for playing back said magnetic tape,
  means for sensing said recorded characteristic codes on said magnetic tape, a paper tape having a series of characteristic codes punched therein in a selected sequence,
means for reading the codes punched in said paper tape,
means for comparing a code on said paper tape with the code aligned for playback on said first magnetic tape,
control means for winding and unwinding said first magnetic tape until the two codes correspond,
a second magnetic tape,
means for effecting, when the two codes correspond, the recording of the then aligned signal on said first magnetic tape without said code onto said second magnetic tape, and
means, when said aligned signal has been recorded on said second magnetic tape, for advancing said paper tape to read the next punched code in said selected sequence on said paper tape.

References Cited

UNITED STATES PATENTS

| | | | |
|---|---|---|---|
| 2,378,383 | 6/1945 | Arndt, Jr. | 324—112 |
| 3,376,505 | 4/1968 | Muir | 324—112 |

RAULFE B. ZACHE, Primary Examiner

U.S. Cl. X.R.

324—112